United States Patent [19]

Nakayama et al.

[11] Patent Number: 5,349,616
[45] Date of Patent: Sep. 20, 1994

[54] REACTOR COOLING SYSTEM FOR BOILING WATER REACTORS

[75] Inventors: Takashi Nakayama; Kanehiro Ochiai, both of Hitachi; Masaki Matsumoto, Katsuta, all of Japan

[73] Assignee: Hitachi, Ltd., Tokyo, Japan

[21] Appl. No.: 53,372

[22] Filed: Apr. 28, 1993

[30] Foreign Application Priority Data

Apr. 30, 1992 [JP] Japan .................................. 4-111698

[51] Int. Cl.⁵ .............................................. G21C 15/18
[52] U.S. Cl. ................................................... 376/282
[58] Field of Search ................................. 376/282, 283

[56] References Cited

U.S. PATENT DOCUMENTS 5,011,652 4/1991 Tominaga et al. ................... 376/282

FOREIGN PATENT DOCUMENTS 54-36490 3/1979 Japan .
63-30786 2/1988 Japan .

OTHER PUBLICATIONS

Modifying Reactor Installation of Nuclear Power Plant at Kashiwazaki Kariba, Japan, pp. 8-5-1 to 8-5-41 (no date).

Primary Examiner—Daniel D. Wasil
Attorney, Agent, or Firm—Antonelli, Terry, Stout & Kraus

[57] ABSTRACT

A reactor cooling system for boiling water reactors comprises a pressure vessel containing a core of a boiling water reactor, a static core injection system including a first water source installed at a position higher than the pressure vessel and a first core injection line communicating the first water source with the pressure vessel, and having a capacity not less than 100% of the capacity necessary to maintain submergence of the core in the pressure vessel, and a plurality of dynamic core injection systems each including a second water source, a second core injection line communicating the second water source with the pressure vessel, and a pump provided in the second core injection line, and each having a capacity not less than 50 % of the capacity necessary to maintain submergence of the core in the pressure vessel. Even when the plurality of dynamic core injection systems fail to inject water in a satisfactory manner, the static core injection system having capacity not less than 100% of the capacity necessary to maintain the submergence of the core is operated to start water injection, whereby the submergence of the core can be surely achieved.

4 Claims, 3 Drawing Sheets

REACTOR COOLING SYSTEM FOR BOILING WATER REACTORS

BACKGROUND OF THE INVENTION

The present invention relates to a reactor cooling system for nuclear power plants, and more particularly to a reactor cooling system for boiling water reactors which is suitable to remove residual heat in a reactor core and cool the reactor core.

One of known reactor cooling systems for boiling water reactors is described in Application for License of Modifying Reactor Installation of Nuclear Power Plant at Kashiwazaki Kariba, Japan, and shown in FIG. 5.2-1. This system is of an emergency core cooling system (ECCS) for an advanced boiling water reactor (ABWR). The construction of FIG. 5.2-1 is shown in FIG. 3 in the simplified form.

Referring to FIG. 3, the ECCS comprises three independent sections, i.e., sections I, II and III. While each section employs an in-plant power source as a normal power source, emergency diesel generators (D/G) 31a to 31c are also provided in the respective sections against cut-off of the in-plant power source. The sections include high pressure core injection systems (HPCF's) 33, 32b, 32c and low pressure core injection systems (LPFL's) 34a to 34c, respectively, these core injection systems being provided in one pair per section and independently of one another. The high pressure core injection system 33 in the section I also serves as a reactor core isolation cooling system (RCIC). Each pair of systems in the sections has capacity not less than 50% of the capacity necessary to maintain submergence of a core in a pressure vessel 2. Accordingly, in case of a single failure in which any one of the sections loses its entire function, the remaining two sections would have total capacity not less than 100% of the capacity necessary to maintain the submergence of the core, thereby assuring of safety.

The HPCF's 32b, 32c and the RCIC 33 are each actuated upon a water level set to a position lower than a normal water level for injecting water into the pressure vessel 2 and suppressing a reduction of the water level even in a condition that the reactor core pressure is still high. The LPFL's 34 are each actuated upon a water level lower than the actuation level of the HPCF's 32b, 32c and the RCIC 33 for injecting water into the pressure vessel 2 when the reactor core pressure becomes low, thereby maintaining the submergence of the core for a long term after the accident.

Supposing now a breakage of any HPCF 32 which is most serious accident in the reactor core cooling, for example, a breakage of the HPCF 32b in the section II, the HPCF 32b stops its function. Additionally, supposing the occurrence of a single failure, for example, a failure of the emergency diesel generator (D/G) 31c in the section III, this would be a very serious accident that the ECCS in the section III stops its entire function at the same time. Even in such an event, the remaining total capacity not less than 100% of the capacity necessary to maintain the submergence of the core would be ensured by the RCIC 33 and the LPFL 34a of the section I and the LPFL 34b of the section II, thus giving the ECCS with a capability of keeping the core submerged in water.

However, the above-mentioned prior art has suffered from the following problems.

In the above-mentioned prior art, all the cooling systems in the three sections of the ECCS are constituted by pumps as dynamic equipment. In an attempt to check the cooling systems in any one section for maintenance during normal operation, if a single failure should occur in another section, only one section would remain operable, making the capacity of the ECCS down to just 50% or more of the capacity necessary to maintain the submergence of the core. Accordingly, the conventional reactor cooling system cannot be checked for maintenance during normal operation. For the same reason, the conventional reactor cooling system cannot deal with incapability of functions in two or more sections, i.e., the occurrence of multiple failures.

As another known related technique, JP, A, 54-36490 discloses a core cooling system for boiling water reactors in which a plurality of dynamic core injection systems and a plurality of static core injection systems are combined with each other. The static core injection systems in this known prior art employ, as a water source, water in an equipment storage pit positioned higher than a pressure vessel containing a core, hence a sufficent amount of water is present. However, it is not clarified whether the total capacity of the static core injection systems is set to be not less than 100% of the capacity enough to achieve submergence of the core. There is thus no full conviction that in case of multiple failures in which plural dynamic core injection systems lose a capability of injecting water, the core would be surely submerged in water by the static core injection systems.

As still another known related technique, JP, A, 63-30786 discloses a core cooling system for pressurized water reactors in which a dynamic core injection system and a static core injection system are combined with each other. The static core injection system in this known prior art employs, as a water source, an injection tank in which water is enclosed under a high pressure.

SUMMARY OF THE INVENTION

An object of the present invention is to provide a highly reliable reactor cooling system for boiling water reactors which enables dynamic core injection systems to be checked for maintenance, and ensures submergence of a core even in case of multiple failures in the dynamic core injection systems.

To achieve the above object, the present invention provides a reactor cooling system for boiling water reactors comprising:

a pressure vessel containing a core of a boiling water reactor, static core injection means including a first water source installed at a position higher than said pressure vessel and a first core injection line communicating said first water source with said pressure vessel, and having a capacity not less than 100% of the capacity necessary to maintain submergence of said core in said pressure vessel, and dynamic core injection means including a plurality of systems each including a second water source, a second core injection line communicating said second water source with said pressure vessel, and a pump provided in said second core injection line, and each having a capacity not less than 50% of the capacity necessary to maintain submergence of said core in said pressure vessel.

With this feature, even when the plurality of systems of dynamic core injection means fail to inject water in a satisfactory manner, the static core injection means having the capacity not less than 100% of the capacity necessary to maintain the submergence of the core is operated to start water injection, whereby the submergence of the core can be surely achieved.

DESCRIPTION OF PREFERRED EMBODIMENTS

Figure 1:
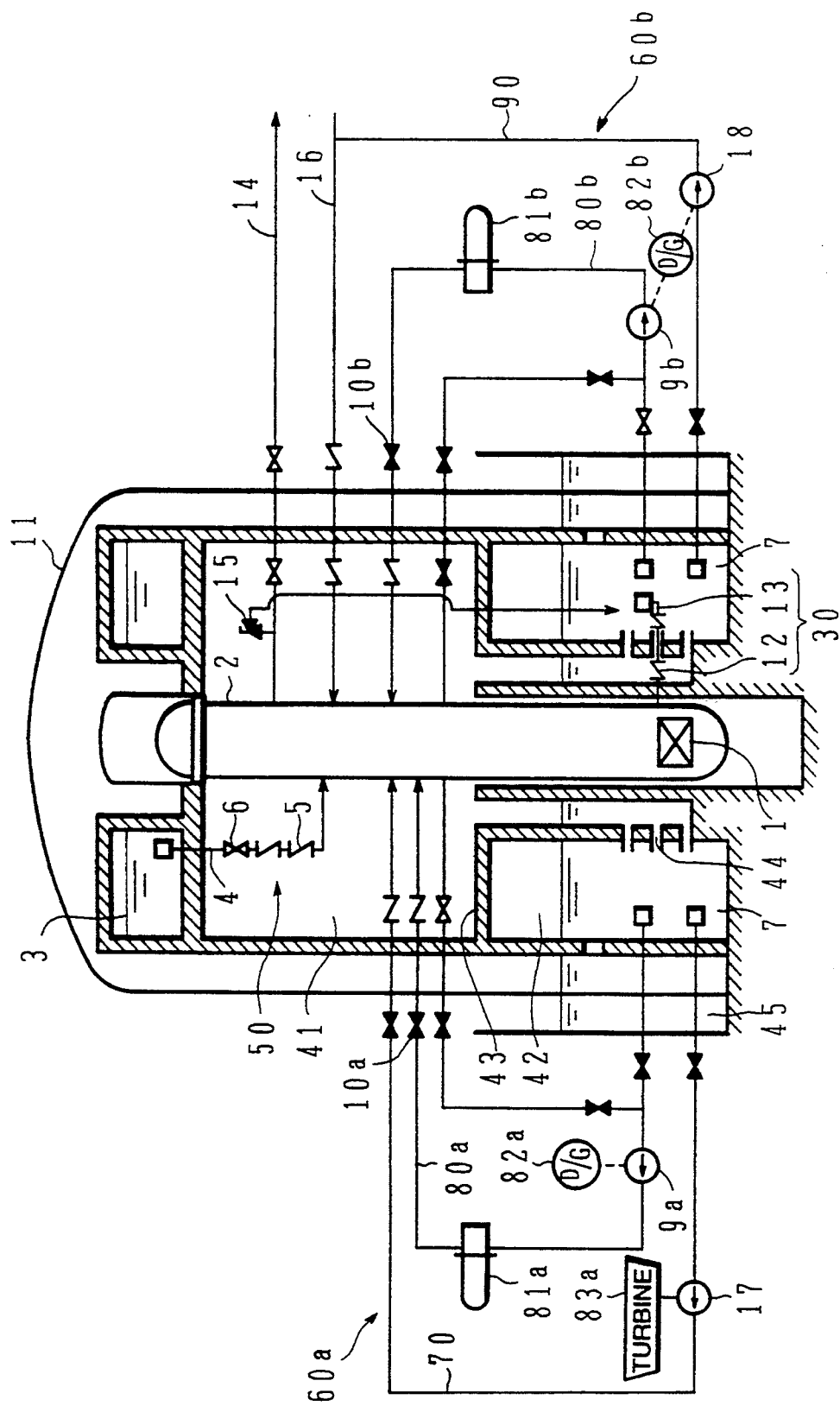
FIG. 1 is diagram showing a reactor cooling system for boiling water reactors according to a first embodiment of the present invention.

The entire construction of a reactor installation for boiling water reactors according to a first embodiment of the present invention is shown in FIG. 1.

Referring to FIG. 1, a reactor pressure vessel 2 housing a reactor core 1 therein is contained inside a reactor containment vessel 11.

Also inside the reactor containment vessel 11, there are disposed a drywell 41 as a containment space in which the reactor pressure vessel 2 is arranged, and a pressure suppression chamber 43 comprising water of a pressure suppression pool 7 disposed around the reactor pressure vessel 2 and a wetwell 42 as a gas phase space above the pressure suppression pool water 7.

The drywell 41 and the pressure suppression pool water 7 are communicated with each other by a plurality of vent pipes 44, so that steam released into the drywell 41 at the time of an accident can be introduced to and condensed in the pressure suppression pool water 7 through the vent pipes 44.

An outer peripheral pool 45 is installed in contact with a wall of the reactor containment vessel 11 outside the pressure suppression pool water 7. The outer peripheral pool 45 serves to cool the reactor containment vessel 11 by removing heat from the pressure suppression pool water 7 via the wall of the reactor containment vessel 11.

Connected to the reactor pressure vessel 2 is a main steam line 14 for introducing, to a turbine, steam generated in the reactor pressure vessel 2 upon cooling water being heated in the core.

The main steam line 14 is provided with a relief safety valve 15 for introducing the steam in the reactor pressure vessel 2 to the pressure suppression pool water 7 for condensation, thereby forcibly reducing the pressure in the reactor pressure vessel 2.

A feed water line 16 for returning both steam and water, discharged after driving the turbine, into the reactor pressure vessel 2 is connected to the reactor pressure vessel 2.

A reactor cooling system comprises two dynamic core injection systems 60a, 60b, one static core injection system 50, and a submergence maintaining system 30.

The dynamic core injection system 60a comprises a low pressure core injection system (LPFL) including a low pressure cooling system pump 9a, a heat exchanger 81a, a dynamic cooling system isolation valve 10a and a low pressure cooling system line 80a, as well as a high pressure core injection system (HPCF) including an isolation cooling system pump 17 and a high pressure cooling system line 70 and also serving as a reactor core isolation cooling system (RCIC). Each of these core injection systems is constructed to inject cooling water into the reactor pressure vessel 2 by using the pressure suppression pool water 7 as a water source. The low pressure cooling system pump 9a is driven by a power source system including an in-plant power source and an emergency diesel generator (D/G) 82a, while the isolation cooling system pump 17 is driven by a steam-powered turbine 83a. The low pressure core injection system (LPFL) of the dynamic core injection system 60a has capacity not less than 50% of the capacity necessary to maintain submergence of the core in the reactor pressure vessel 2 at the time of a loss-of-coolant accident.

As with the dynamic core injection system 60a, the dynamic core injection system 60b comprises a low pressure core injection system (LPFL) including a low pressure cooling system pump 9b, a heat exchanger 81b, a dynamic cooling system isolation valve 10b and a low pressure cooling system line 80b, as well as a high pressure core injection system (HPCF) including a high pressure cooling system line 90 connected to the feed water line 16 and a high pressure cooling system pump 18. Each of these core injection systems is also constructed to inject cooling water into the reactor pressure vessel 2 by using the pressure suppression pool water 7 as a water source. The low pressure cooling system pump 9b and the high pressure cooling system pump 18 are both driven by a power source system including an in-plant power source and an emergency diesel generator (D/G) 82b. The low pressure core injection system (LPFL) of the dynamic core injection system 60b also has capacity not less than 50% of the capacity necessary to maintain submergence of the core in the reactor pressure vessel 2 at the time of a loss-of-coolant accident.

The static core injection system 50 comprises a static cooling system pool 3 of gravity driven type installed above the reactor pressure vessel 2, a static cooling system line 4 connecting the static cooling system pool and the reactor pressure vessel 2, a static cooling system check valve 5 disposed in the static cooling system line 4 for allowing a flow only from the static cooling system pool 3 toward the interior of the reactor pressure vessel 2, and a static cooling system isolation valve 6 disposed in the static cooling system line 4. Further, the static core injection system 50 has capacity not less than 100 of the capacity necessary to maintain submergence of the core in the reactor pressure vessel 2 at the time of a loss-of-coolant accident.

The submergence maintaining system 30 comprises a submergence maintaining system isolation valve 12 and a submergence maintaining system line 13, the system 30 being operated when the pressure in the reactor pressure vessel 2 becomes equal to the pressure in the drywell 41 after a loss-of-coolant accident.

The relief safety valve 15 releases the steam in the reactor pressure vessel 2 to the pressure suppression pool water 7 for reducing the pressure in the reactor pressure vessel 2, when a pressure drop in the reactor pressure vessel 2 is not sufficient.

In the above, the capacity of the dynamic core injection systems 60a, 60b and the static core injection system 50 expressed on an assumption that the capacity able to maintain submergence of the core during the time after start-up of operation of any core injection system until the submergence maintaining system 30 starts operation is 100%. Thus, the core injection system having capacity of 100% means that the system has a capability of maintaining the submergence of the core by itself alone, and the core injection system having capacity of 50% means that the system has a capability of maintaining the submergence of the core by cooperation with another system, i.e., by two systems of the same type. In the case of the dynamic core injection system, the system capacity is essentially determined by delivery capacity of the low pressure cooling system pump, the isolation cooling system pump, or the high pressure cooling system pump. In the case of the static core injection system, the system capacity is essentially determined by a water head pressure and a water amount of the static cooling system pool and a diameter of the static core injection system line.

The reactor installation for boiling water reactors in this embodiment is constructed as explained above and operates as follows in the event of a loss-of-coolant accident.

Supposing, as a loss-of-coolant accident, a breakage of the main steam line connected to the reactor pressure vessel 2, a coolant in the reactor pressure vessel 2 is released to the interior of the reactor containment vessel 11, whereby not only a water level but also a pressure in the reactor pressure vessel 2 are reduced.

By the high pressure cooling system pumps 17 and 18 being driven in response to a first lower core water level signal, the high pressure core injection systems (HPCF's) of the dynamic core injection systems 60a and 60b start operation to inject the water of the pressure suppression pool 7 into the reactor pressure vessel 2.

When the water level in the reactor pressure vessel 2 further lowers with the elapse of time after the accident, the low pressure cooling system pumps 9a and 9b are now driven in response to a second lower core water level signal for starting operation of the respective low pressure core injection systems (LPFL's), so that the LPFL's inject the water of the pressure suppression pool 7 into the reactor pressure vessel 2 upon the pressure in the reactor pressure vessel 2 being reduced down to a predetermined value.

When the pressure in the reactor pressure vessel 2 still further lowers to such an extent that it becomes smaller than a value resulted by subtracting the pressure loss in the static cooling system line 4 from a difference between the waterhead pressure of the static cooling system pool 3 and the pressure in the reactor pressure vessel the static core injection system 50 is operated to inject the water of the static cooling system pool 3 into the reactor pressure vessel 2 via the static cooling system line 4.

When the pressure in the reactor pressure vessel 2 becomes almost equal to the pressure in the drywell 41 inside the reactor containment vessel 11 with the subsequent elapse of time, the submergence maintaining system starts operation to prevent a further drop of the water level in the reactor pressure vessel 2 and maintain the submergence of the core 1 with the aid of the submergence maintaining system isolation valve 12 and the submergence maintaining system line 13 connecting the reactor pressure vessel 2 and the pressure suppression pool water 7 Go each other.

In this connection, when the broken area of the line is so small that the pressure in the reactor pressure vessel 2 will not appreciably lower, the relief safety valve 15 disposed in the main steam line 14 is forcibly opened to release the steam in the reactor pressure vessel 2 into the pressure suppression pool water 7 for reducing the pressure in the reactor containment vessel 11, thereby causing the dynamic core injection system and the static core injection system to operate.

In the above operation, because the respective low pressure injection systems (LPFL's) of the dynamic core injection systems 60a and 60b, which are operated upon a drop of the water level in the reactor pressure vessel 2, each have capacity not less than 50%, the submergence of the core 1 can be maintained by the dynamic core injection systems 60a and 60b only.

What has been described above is the operation sequence to be followed in the case that no failures occur in the reactor cooling system. In case of a failure in any one of the dynamic core injection systems 60a and 60b, the other dynamic core injection system remaining not failed would be first operated upon a drop of the water level in the reactor pressure vessel 2, and the static core injection system 50 would be then operated upon a subsequent reduction of the pressure in the reactor pressure vessel 2 effected with the accident or forcibly through the relief safety valve 15.

In this case, because the static core injection system 50 has capacity not less than 100%, the submergence of the core 1 in the reactor containment vessel 2 can be maintained.

Alternatively, if the remaining system is failed while any one of the dynamic core injection systems 60a and 60b is subjected to maintenance service during normal operation, both dynamic core injection systems would fail to function even upon a drop of the water level in the reactor pressure vessel 2, but the static core injection system 50 would be operated upon a subsequent reduction of the pressure in the reactor pressure vessel 2 effected with the accident or forcibly through the relief safety valve 15. In this case, therefore, the submergence of the core 1 in the reactor containment vessel 2 can also be maintained as with the above case.

In still another case of the two dynamic core injection systems 60a and 60b being failed at the same time, the static core injection system 50 would be operated upon a reduction of the pressure in the reactor pressure vessel 2 effected with the accident or forcibly through the relief safety valve 15 and, therefore, the submergence of the core 1 in the reactor containment vessel 2 can also be maintained.

Furthermore, during reactor shut-down, the high pressure core injection system (HPCF) of the dynamic core injection systems 60a can be used as a reactor core isolation cooling system (RCIC) and the low pressure core injection system (LPFL) thereof can be used as a heat removing system.

With this embodiment, as described above, in an attempt to check any one of the two dynamic core injection systems for maintenance during normal operation, the submergence of the core in the reactor containment vessel can be maintained by the remaining static core injection system alone not only in the case that the reactor cooling system is normal, but also even in case of the occurrence of a single failure in the other core injection system. As a result, the dynamic core injection system 60a or 60b can be subjected to maintenance service during normal operation.

Additionally, even if the two dynamic core injection systems 60a and 60b are failed at the same time, a loss-of-coolant accident could be dealt with operation of the static core injection system 50, resulting in improved reliability of the reactor cooling system.

Figure 2:
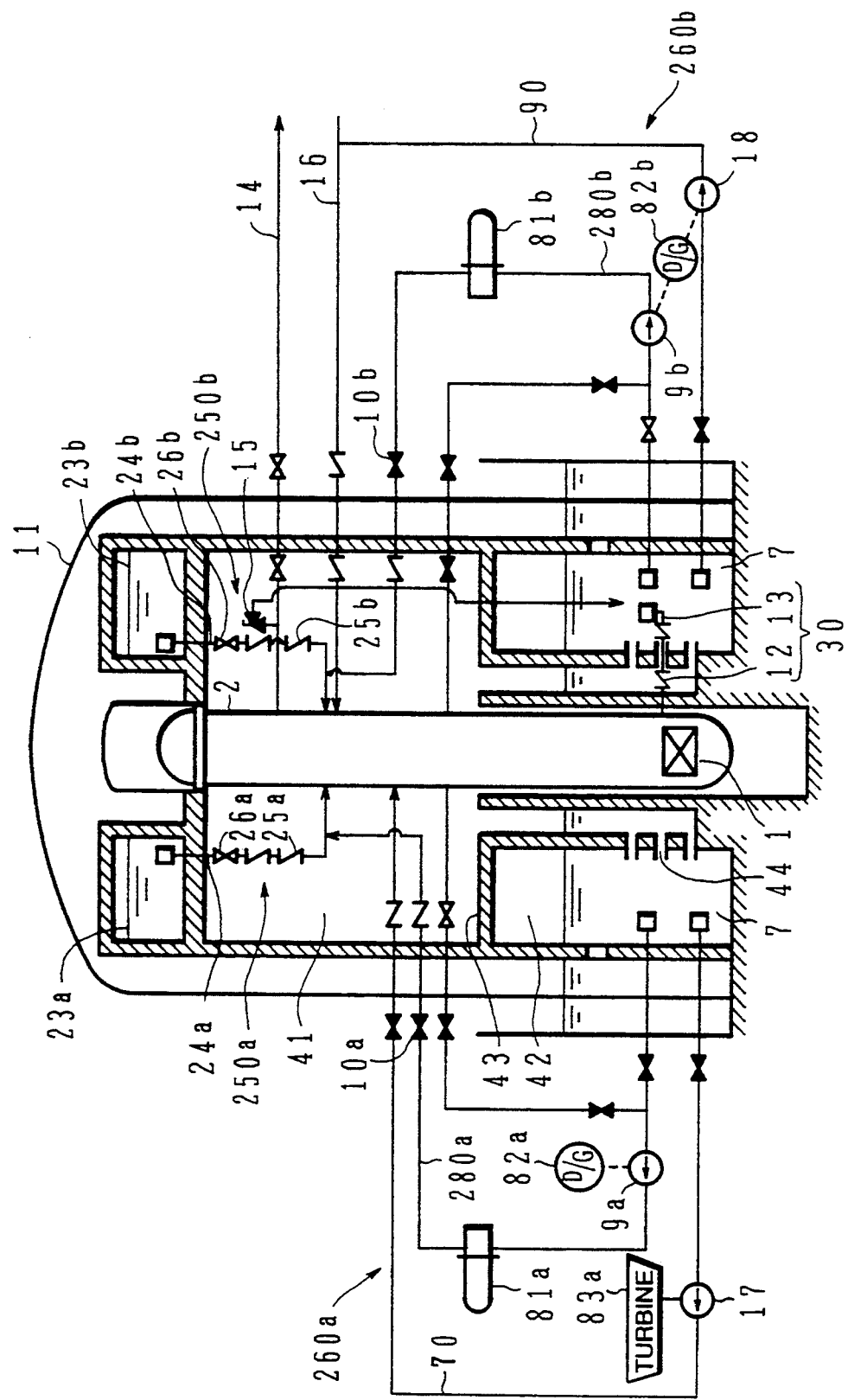
FIG. 2 is diagram showing a reactor cooling system for boiling water reactors according to a second embodiment of the present invention.
Figure 3:
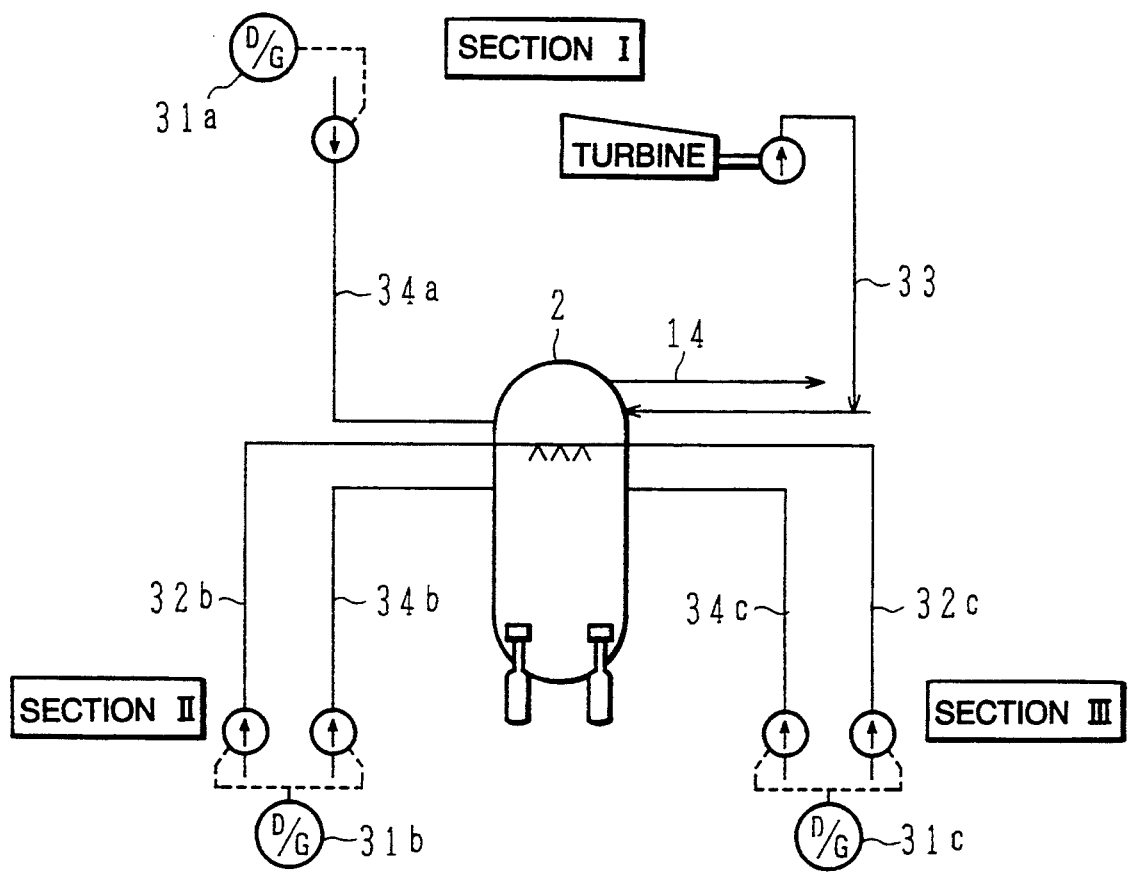
FIG. 3 is diagram showing a reactor cooling system for boiling water reactors according to the known prior art.

FIG. 2 shows a second embodiment of the present invention. A reactor cooling system of the reactor installation for boiling water reactors shown in FIG. 2 comprises two static core injection systems 250a, 250b, two dynamic core injection systems 260a, 260b, and a submergence maintaining system 30.

This second embodiment is basically similar to the above first embodiment except that the two dynamic core injection systems are provided and injection lines of the dynamic core injection systems are connected in a different manner. Common parts to those in the first embodiments are denoted by common reference numerals.

The dynamic core injection system 260a comprises, similarly to the dynamic core injection system 60a in the first embodiment, a low pressure core injection system (LPFL) including a low pressure cooling system pump 9a, a heat exchanger 81a, a dynamic cooling system isolation valve 10a and a low pressure cooling system line 280a, as well as a high pressure core injection system (HPCF) including an isolation cooling system pump 17 and a high pressure cooling system line 70 and also serving as a reactor core isolation cooling system (RCIC). The dynamic core injection system 260a is different from the foregoing system 60a in that the low pressure cooling system line 280a of the low pressure core injection system (LPFL) is connected to a static cooling system line 24a of the static core injection system 250a at a location downstream of a check valve 25a provided in the static cooling system line 24a.

In that arrangement, the low pressure cooling system pump 9a is set such that a pressure resulted by subtracting the pressure loss through the line from a pump delivery point to a connection point between the low pressure cooling system line 280a and the static cooling system line 24a from the delivery pressure of the low pressure cooling system pump 9a is larger than a waterhead pressure from the above line connection point to the water surface of a static cooling system pool 3.

The remaining construction is basically similar to the first embodiment. The low pressure core injection system (LPFL) of the dynamic core injection system 260a also has capacity not less than 50% of the capacity necessary to maintain submergence of a core 1 in a reactor pressure vessel 2 at the time of a loss-of-coolant accident.

The dynamic core injection system 260b is of the similar construction to the dynamic core injection system 260a except that a high pressure core injection system (HPCF) does not serves as a reactor core isolation cooling system (RCIC) and a low pressure cooling system line 280b of its low pressure core injection system (LPFL) is connected to a static cooling system line 24b of the static core injection system 250b at a location downstream of a check valve 25b provided in the static cooling system line 24b.

The low pressure core injection system (LPFL) of the dynamic core injection system 260b also has capacity not less than 50% of the capacity necessary to maintain submergence of the core in the reactor pressure vessel 2 at the time of a loss-of-coolant accident.

The static core injection system 250a comprises a static cooling system pool 23a of gravity driven type installed above the reactor pressure vessel 2, the static cooling system line 24a connecting the static cooling system pool 23a and the reactor pressure vessel 2, and the static cooling system check valve 25a and a static cooling system isolation valve 26a both disposed in the static cooling system line 24a.

The static core injection system 250a also has capacity not less than 50% of the capacity necessary to maintain submergence of the core in the reactor pressure vessel 2 at the time of a loss-of-coolant accident.

The static core injection system 250b is of the similar construction to the static core injection system 250a and also has capacity not less than 50% of the capacity necessary to maintain submergence of the core in the reactor pressure vessel 2 at the time of a loss-of-coolant accident.

The submergence maintaining system 30 comprises, as with the above first embodiment, a submergence maintaining system isolation valve 12 and a submergence maintaining system line 13, the system 30 being operated when the pressure in the reactor pressure vessel 2 becomes equal to the pressure in a drywell 41 after a loss-of-coolant accident.

Note that while the static cooling system pools 23a, 23b as water sources are separately provided for the static core injection system 250a, 250b in this embodiment, a single pool may be provided as with the above first embodiment and shared by the two static core injection systems.

The reactor installation for boiling water reactors in this embodiment is constructed as explained above and operates as follows in the event of a loss-of-coolant accident.

In the case that no failures exist in the reactor cooling system at the time of a loss-of-coolant accident, the dynamic core injection systems operate following almost the same sequence as the above first embodiment.

More specifically, when a coolant in the reactor pressure vessel 2 is released to the interior of the reactor containment vessel 11, whereby not only a water level but also a pressure in the reactor pressure vessel 2 are reduced. In response to a first lower core water level signal, the high pressure core injection systems (HPCF's) of the dynamic core injection systems 260a and 260b start operation to inject the water of the pressure suppression pool 7 into the reactor pressure vessel 2. After that, in response to a second lower core water level signal indicating a lower core water level than the above first signal, the respective low pressure core injection systems (LPFL's) start operation so that the LPFL's inject the water of the pressure suppression pool 7 into the reactor pressure vessel 2 upon the pressure in the reactor pressure vessel 2 being reduced down to a predetermined value.

At this time, however, since the low pressure cooling system lines 280a and 280b are respectively connected to the static cooling system lines 24a and 24b at locations downstream of the check valves 25a and 25b unlike the above first embodiment, the static core injection systems 250a and 250b will not start operation to allow injection of cooling water into the reactor pressure vessel 2 so long as the dynamic core injection systems 260a and 260b normally continue operation, for the reason that each pressure resulted by subtracting the pressure loss through the line from a pump delivery point to a connection point between the low pressure cooling system line 280a, 280b and the static cooling system line 24a, 24b from the delivery pressure of the low pressure cooling system pump 9a, 9b is larger than a waterhead pressure from the above line connection point to the water surface of the static cooling system pool 23a, 23b.

In the above operation, because the respective low pressure injection systems of the two dynamic core injection systems 260a and 260b under normal operation each have capacity not less than 50% of the capacity necessary to maintain the submergence of the core 1 in the reactor pressure vessel 2, the total capacity not less than 100% can be ensured by those two systems so that the submergence of the core 1 in the reactor pressure vessel 2 is maintained.

In case of a failure in any one of the dynamic core injection systems 260a and 260b, e.g., in the dynamic core injection systems 260a, the other dynamic core injection system 260b remaining not failed would be first operated upon a drop of the water level in the reactor pressure vessel 2, and the static core injection system 250a on the same side as the failed dynamic core injection systems 260a would be then operated upon a subsequent reduction of the pressure in the reactor pressure vessel 2 effected with the accident or forcibly through the relief safety valve 15.

In this case, because the dynamic core injection systems 260b and the static core injection system 250a each have capacity not less than 50% of the capacity necessary to maintain the submergence of the core 1 in the reactor pressure vessel 2, the total capacity not less than 100% can be ensured by those two systems so that the submergence of the core 1 in the reactor pressure vessel 2 is maintained.

The above explanation also equally applies to the case that the dynamic core injection systems 260b is failed.

Alternatively, if the remaining system is failed while any one of the dynamic core injection systems 260a and 260b is subjected to maintenance service during normal operation, both dynamic core injection systems 260a and 260b would fail to function even upon a drop of the water level in the reactor pressure vessel 2 and, therefore, the static core injection systems 250a and 250b would be both operated upon a subsequent reduction of the pressure in the reactor pressure vessel 2 effected with the accident or forcibly through the relief safety valve 15.

In this case, because the two static core injection systems 250a and 250b each have capacity not less than 50% of the capacity necessary to maintain the submergence of the core 1 in the reactor pressure vessel 2, the total capacity not less than 100% can be ensured by those two systems so that the submergence of the core 1 in the reactor pressure vessel 2 is maintained.

In still another case of the two dynamic core injection systems 260a and 260b being failed at the same time, the static core injection system 250a and 250b would be both operated in a like manner to the above case and, therefore, the submergence of the core 1 in the reactor containment vessel 2 can also be maintained.

With this second embodiment, similarly to the above first embodiment, the dynamic core injection system 60a or 60b can be subjected to maintenance service during normal operation. Furthermore, even if the two dynamic core injection systems 260a and 260b are failed at the same time, a loss-of-coolant accident could be dealt with operation of both the static core injection systems 250a and 250b, resulting in improved reliability of the reactor cooling system. In addition to those advantages common to the first embodiment, this second embodiment has another advantage that since the static core injection systems 250a and 250b are operated only when the corresponding dynamic core injection systems 260a and 260b are not operable, useless operation of the static core injection systems 250a and 250b can be avoided.

It should be noted that while the pressure suppression pool water of gravity driven type is used as a water source for the dynamic core injection systems in the foregoing embodiments, the pool water may be cooling water contained in a reservoir tank under pressure by the presence of internal gas or so.

According to any of the first and second embodiments, the dynamic core injection systems can be subjected to maintenance service one by one during normal operation. Further, even if multiple failures occur in the dynamic core injection systems, the submergence of the core can be ensured by operation of at least one static core injection system, with the result of improved reliability.

In addition, according to the second embodiment of the present invention, the static core injection system is operated only when the corresponding dynamic core injection system is not operable, thus making it possible to avoid useless operation of the static core injection system.

What is claimed is:

1. A reactor cooling system for boiling water reactors comprising:

a pressure vessel containing a core of a boiling water reactor;

a pressure suppression pool filled with a water and disposed to surround the pressure vessel;

static core injection means including two systems having a capacity in total not less than 100% of the capacity necessary to maintain submergence of said core in said pressure vessel; and dynamic core injection means including two systems having a capacity in total not less than 100% of the capacity necessary to maintain submergence of said core in said pressure vessel;

said two systems of said static core injection means each having a water source installed at a position inside the reactor container higher than said pressure vessel, a first core injection line communicating said water source with said pressure vessel, and first valve means provided in said first core injection line and including an isolation valve and a check valve for allowing only a flow of cooing water from said water source of said pressure vessel, and each system having a capacity not less than 50% of the capacity necessary to maintain the submergence of said core in said pressure vessel;

said two systems of said dynamic core injection means each having a second core injection line communicating said pressure suppression pool with said pressure vessel, a pump provided in said second core injection line, and second valve means provided in said second core injection line and including an isolation valve and a check valve for allowing only a flow of cooling water from said pressure suppression pool to said pressure vessel, and each system having a capacity not less than 50% of the capacity necessary to maintain the submergence of said core in said pressure vessel; and said first core injection line and said second core injection line being connected with each other at a location downstream of said first valve means and said second valve means.

2. A reactor cooling system for boiling water reactors according to claim 1, wherein said water source is a gravity driven pool filled with water.

3. A reactor cooling system for boiling water reactors according to claim 1, wherein said first water source is a reservoir tank in which water is contained under pressure.

4. A reactor cooling system for boiling water reactors according to claim 1, wherein said two systems of said dynamic core injection means each includes a low pressure core injection means and a high pressure core injection means, each of said low pressure core injection means having a capacity not less than 50% of the capacity necessary to maintain submergence of said core in said pressure vessel.

* * * * *